United States Patent

Kuramoto et al.

Patent Number: 5,977,710
Date of Patent: Nov. 2, 1999

[54] PATCH ANTENNA AND METHOD FOR MAKING THE SAME

[75] Inventors: Akio Kuramoto; Kosuke Tanabe, both of Tokyo, Japan

[73] Assignee: NEC Corporation, Tokyo, Japan

[21] Appl. No.: 08/814,343

[22] Filed: Mar. 11, 1997

[30] Foreign Application Priority Data

Mar. 11, 1996 [JP] Japan .................................. 8-052719

[51] Int. Cl.⁶ .................................................... H01Q 3/02
[52] U.S. Cl. .................................... 313/700 MS; 343/872
[58] Field of Search ............................ 343/700 MS, 702, 343/872

[56] References Cited

U.S. PATENT DOCUMENTS

| | | |
|---|---|---|
| 4,987,421 | 1/1991 | Sunahara et al. . |
| 5,210,542 | 5/1993 | Pett et al. ...................... 343/700 MS |
| 5,382,959 | 1/1995 | Pett et al. ...................... 343/700 MS |

FOREIGN PATENT DOCUMENTS

| | | |
|---|---|---|
| 0366593 | 5/1990 | European Pat. Off. . |
| 0394489 | 10/1990 | European Pat. Off. . |
| 0618061 | 10/1994 | European Pat. Off. . |
| 0629785 | 12/1994 | European Pat. Off. . |
| 61-281605 | 12/1986 | Japan . |
| 625917 | 1/1987 | Japan . |
| 62-228705 | 10/1987 | Japan . |
| 2-141007 | 5/1990 | Japan . |
| 2141007 | 5/1990 | Japan . |
| 3-74908 | 3/1991 | Japan . |
| 3121716 | 12/1991 | Japan . |
| 483391 | 3/1992 | Japan . |

OTHER PUBLICATIONS

Reprint from *Elec. Lett.*, R.Q. Lee et al., "Characteristics of a Two–Layer Electromagnetically Coupled Rectangular Patch Antenna", vol. 23, No. 20, Sep. 1987, pp. 1070–1072.
Reprint from *IEEE Trans. Antennas Propaga.*, F. Croq et al., "Millimeter–Wave Design of Wide–Band Aperture–Coupled Stacked Microstrip Antennas", vol. 39, No. 12, Dec. 1991, pp. 1770–1776.
Patent Abstracts of Japan, vol. 014, No. 383 (E–0966), Aug. 17, 1990.
Patent Abstracts of Japan vol. 095, No. 010, Nov. 30, 1995.
Patent Abstracts of Japan vol. 015, No. 241 (E–1080).

*Primary Examiner*—Don Wong
*Assistant Examiner*—Jennifer H. Malos
*Attorney, Agent, or Firm*—Sughrue, Mion, Zinn, Macpeak & Seas, PLLC

[57] ABSTRACT

A patch antenna has: a driven patch fed with a high-frequency signal and radiates a high-frequency electromagnetic field from its one surface; a parasitic patch receives the high-frequency electromagnetic field from the driven patch at a first surface and reradiates the high-frequency electromagnetic field from a second surface; and a radome which protectively holds the driven patch and the parasitic patch inside of the radome; wherein the parasitic patch is held by the inner surface of the radome which contacts the second surface of the parasitic patch and by a holder which protrudes from the inner surface of the radome and covers a part of the first surface of the parasitic patch.

7 Claims, 5 Drawing Sheets

PATCH ANTENNA AND METHOD FOR MAKING THE SAME

FIELD OF THE INVENTION

This invention relates generally to a patch antenna, and more particularly, to a patch antenna which has a driven patch with a microstrip structure, a parasitic patch which reradiates an electromagnetic field received from the driven patch, a radome containing these patches to protect them, and a method for making the same.

BACKGROUND OF THE INVENTION

It is known that a patch antenna, composed of a driven patch and a parasitic patch structured as two electromagnetic wave radiating layers, has an excellent broad-band performance. By protecting such patch antenna inside a radome, a patch antenna structure leaving the advantages in terms of portability as mobile communication means, reliability, and aesthetic appearance can be provided. For example, such structures are disclosed in Japanese patent application laid-open No.2-141007(1990) and Japanese patent application laid-open No.3-74908(1991), where the former discloses a microstrip antenna in which a parasitic patch is adhered to inner surface of a radome and the latter discloses a stacked microstrip antenna in which a parasitic patch is buried in the wall of a radome.

However, in these conventional patch antennas disclosed a problem is that the number of fabrication steps must increase due to requiring the adhesion of the parasitic patch to the radome or the burying of the parasitic patch in the wall of the radome. Also, it is difficult to position the parasitic patch at a proper position on the radome or in the wall of the radome.

SUMMARY OF THE INVENTION

Accordingly, it is an object of the invention to provide a patch antenna in which a parasitic patch is precisely positioned and firmly fixed onto the inner surface of a radome.

It is a further object of the invention to provide a method for making a patch antenna which facilitates the positioning and fixing of a parasitic patch onto the inner surface of a radome.

According to the invention, a patch antenna comprises:

a driven patch is fed with a high-frequency signal that radiates a high-frequency electromagnetic field from its one surface;

a parasitic patch that receives the high-frequency electromagnetic field from the driven patch at its one surface and reradiates the high-frequency electromagnetic field from its other surface; and a radome that protectively contains the driven patch and the parasitic patch inside of the radome and holds the parasitic patch;

wherein the parasitic patch is held between the inner surface of the radome and the inner surface of a holder which contacts the other surface of the parasitic patch, and wherein the holder protrudes from the inner surface of the radome and covers a part of said other surface of the parasitic patch.

According to another aspect of the invention, a method for making a patch antenna having a driven patch fed with a high-frequency signal that radiates a high-frequency electromagnetic field from its first surface, a parasitic patch that receives the high-frequency electromagnetic field from the driven patch at its one surface and reradiates the high-frequency electromagnetic field from its other surface, and a radome which protectively contains the driven patch and the parasitic patch inside of the radome and holds the parasitic patch, comprising the steps of:

making the radome with an inner surface having a protruding boss with a height greater than a thickness; of the parasitic patch;

pressing the second surface of the parasitic patch to contact the inner surface of radome along the circumferential shape of the boss;

thermosoftening a part of the boss protruding above the first surface of the parasitic patch and forming it into a shape to cover a part of the first surface of the parasitic patch in order to provide a holder; and cooling and hardening the holder to hold the parasitic patch between the radome and the holder.

BRIEF DESCRIPTION OF THE DRAWINGS

The invention will be explained in more detail in conjunction with the appended drawings, wherein.

DESCRIPTION OF THE PREFERRED EMBODIMENTS

Figure 1A:
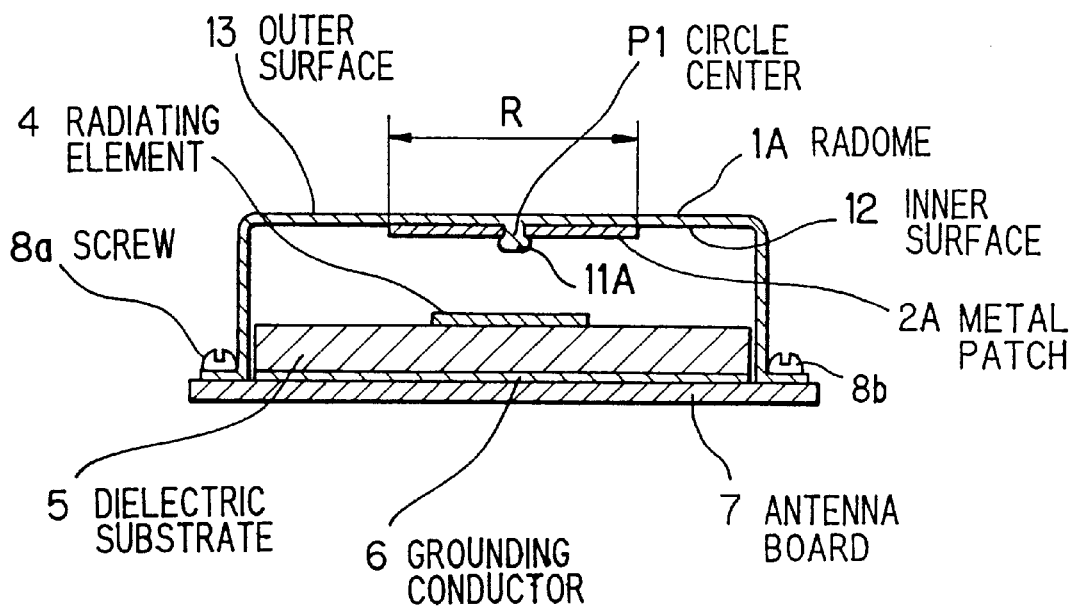
FIG. 1A is a cross sectional view showing a patch antenna in a first preferred embodiment according to the invention.
Figure 1B:
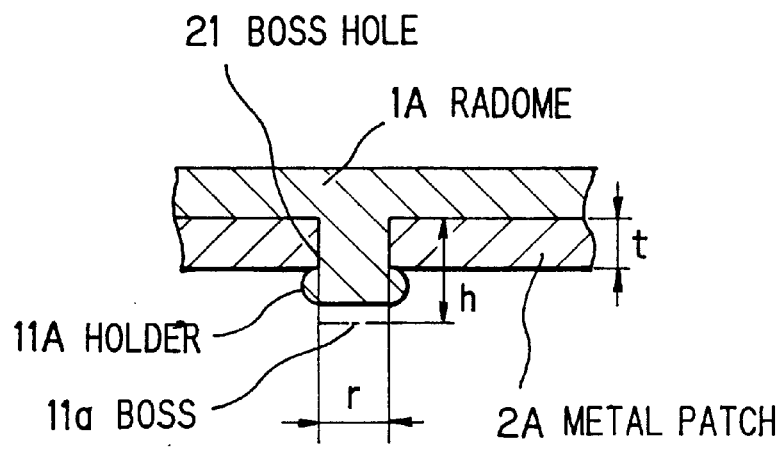
FIG. 1B is an enlarged partial view showing the patch antenna in FIG. 1A.
Figure 2:
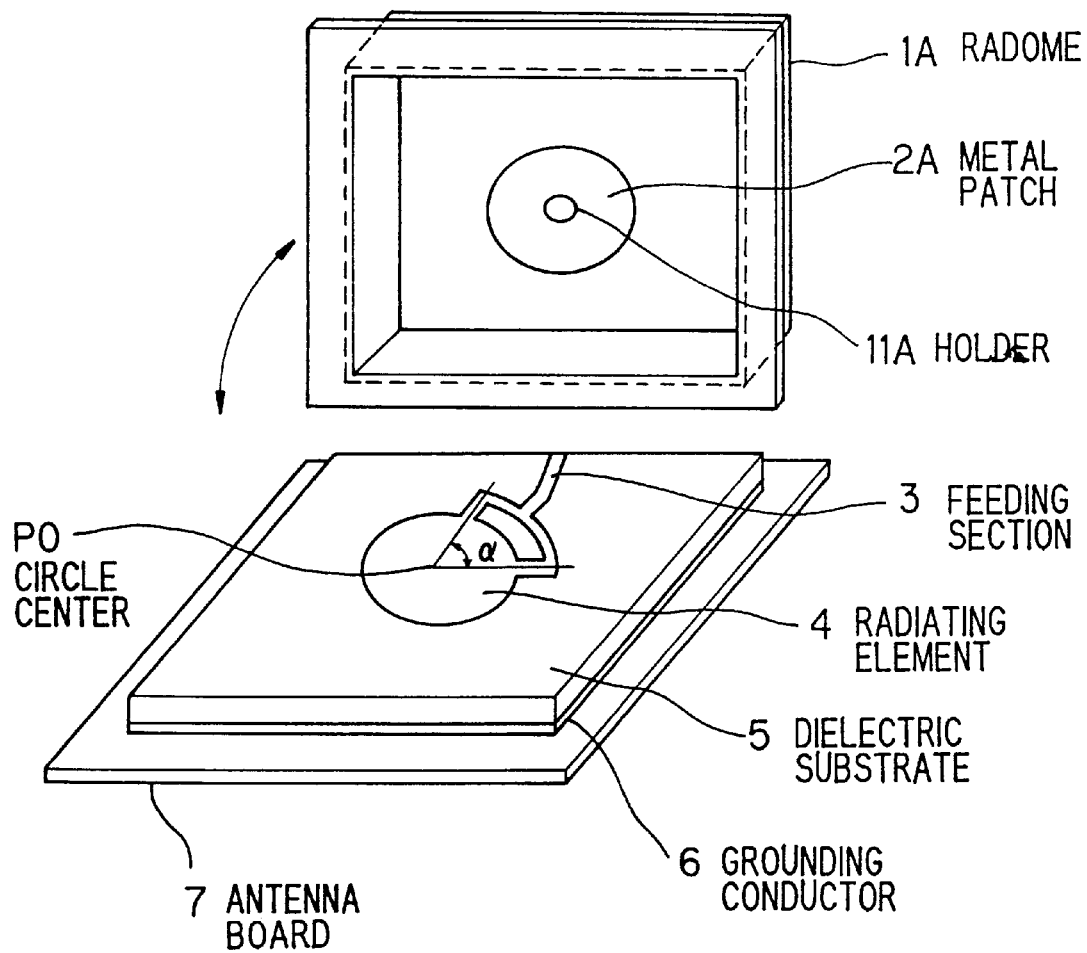
FIG. 2 is a perspective view showing the separated state of the patch antenna in the first embodiment.
Figure 3A:
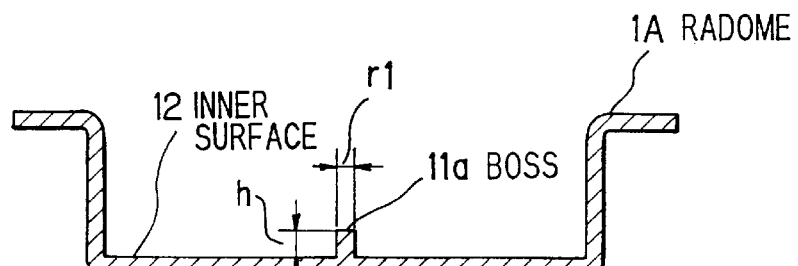
FIGS. 3A to 3D are cross sectional views showing a method of making a patch antenna in a preferred embodiment according to the invention.
Figure 3B:
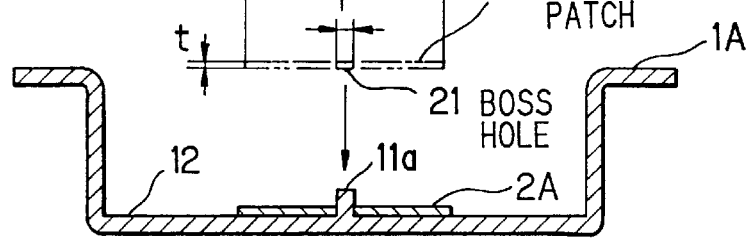
Figure 3C:
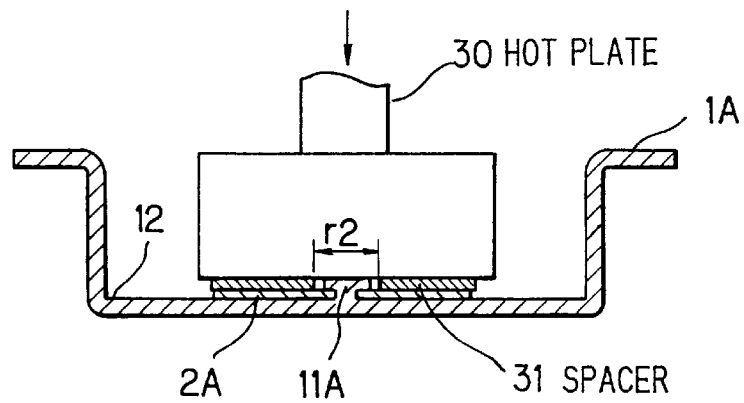
Figure 3D:
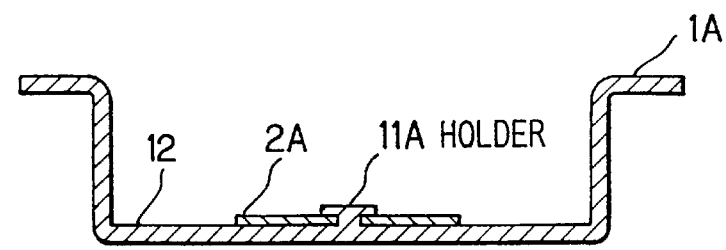

A patch antenna in the first preferred embodiment will be explained by referring to FIGS. 1A to 2, where FIG. 1A is a cross sectional view thereof FIG. 1B is an enlarged view showing a part of FIG. 1A, and FIG. 2 is a perspective view showing separated radome 1A and the other parts of the patch antenna shown in FIG. 1A.

As shown in FIG. 1A and 2, a microstrip structure is formed with a feeding section 3 and a radiating element 4 which are processed of a printed board having a dielectric substrate 5, and a grounding conductor 6 which retains the original shape of a printed board. A metal patch 2A and the radiating element 4 form a broad- band microstrip antenna. The high-frequency wave fed through the feeding section 3 is resonated by the metal patch 2A and the radiating element 4. If the diameter and resonance frequency of the radiating element 4 are D1, f1, respectively, the diameter and resonance frequency of the metal patch 2A are D2, f2, respectively, and D2>D1 is given, f1>f2 is obtained. Further, if a center frequency f0 is given by f0=(f1+f2)/2), a frequency band, which is given by (f1−f2)/f0, is nearly equal to 0.1. The radiating element 4 fed through the feeding section 3 resonates near the frequency f1 and radiates an electric wave. The metal patch 2A is electromagnetically coupled with the radiating element 4, thereby resonating near the frequency f2 and radiating an electric wave. As a result, a high-frequency signal with a circularly polarized wave electromagnetic field is radiated in the direction of the outer surface 13 of the radome 1A which is made of plastic having a low loss The microstrip structure, including the radiating element 4 and the metal patch 2A, is covered with the inner surface of the radome 1A and an antenna board 7 on which the microstrip structure is fixed, thereby being protected from the external environment.

Further explaining this patch antenna in detail, the feeding section 3 and the radiating element 4 are formed on the same surface of a printed board by etching. The radiating element 4, formed like a disk is fed with a phase difference of 90° from two positions having an angle of E=90° between each other, branched from the feeding circuit 3. By this feeding, the radiating element 4 radiates the circularly polarized wave electromagnetic field from its one surface. The metal patch 2A, made of a thin plate of aluminum and formed like a disk, receives the circularly polarized wave's electromagnetic field at its one surface and then reradiates it from the other surface. The other surface of the metal patch 2A is in contact with the inner surface 12 of the radome 1A, and the metal patch 2A is held between the inner surface 12 of the radome 1A and a holder 11A which protrudes from the inner surface 12 and covers a part of the lower surface of the metal patch 2A. The holder 11A is formed, as explained later, by processing the tip of a boss 11a. The radome 1A is pressed upon the antenna board 7 as it is guided along the circumference, or edge of the microstrip structure and is then fixed to the antenna board 7 by screws 8a, 8b. The means for fixing the radome 1A to the antenna board 7 is not limited to using screws, and another fixing means by which the position relationship between the radome 1A and the antenna board 7 can be precisely determined may be employed.

Next, the fixing of the metal patch 2A to the radome 1A will be explained in detail. The metal patch 2A has a boss hole 21 that is a through-hole at the center of the surface, i.e., at the position of a circle center P1. The inner diameter r of the boss hole 21 is preferably around 5R/100, where R is the outer diameter of the metal patch 2A, taking into account the deterioration in the radiation characteristic of the circularly polarized wave electromagnetic field and the holding strength of the metal patch 2A to the radome 1A. For example, if the service frequency of the patch antenna is 1.5 GHz to 1.6 GHz, it is suitable that the metal patch 2A has an outer diameter of R≈80 mm, a thickness of t≈0.5 mm and a boss hole inner diameter of r≈4 mm. On the inner surface 12 of the radome 1A, the holder 11A is formed to cover a part of the lower surface of the metal patch 2A around the boss hole 21.

The holder 11A is a structure obtained by processing the tip of the boss 11a that protrudes from the inner surface of the radome 1A. The height h of the boss 11a is greater than the thickness t of the metal patch 2A, and the outer diameter r1 of the boss 11a is a little less than the inner diameter r of the boss hole 21 of the metal patch 2A. The boss 11a is positioned such that the circle center P1 of the metal patch 2A is located, as shown in FIG. 1A, just above the circle center P0 of the radiating element 4 when the radome 1A is fixed on the antenna board 7. After the upper surface of the metal patch 2A is pressed upon the inner surface 12 of the radome 1A where the metal patch 2A is guided by the boss 11a, the tip of the boss 11a is softened by heating and compressed in the direction of the inner surface 12, thereby transformed into a form to cover a part of the lower surface of the metal patch 2A, then cooled and hardened to provide the holder 11A as shown. The radome 1A can be made of polycarbonate and the like. The thermosoftening temperature(glass transition temperature) Tg, where polycarbonate is softened by heating, is around 150° C., the crystal-melting temperature Tm where it is fluidized is around 240° C., and the heat-resisting temperature where it is used in the solid state is around 125° C.

FIGS. 3A to 3D show a process of fixing the metal patch 2A to the radome 1A in the patch antenna in FIG. 1A, where FIGS. 3A to 3D correspond to the first to fourth steps, respectively.

In the first step, the radome 1A, having an inner surface of with a protruding boss 11a having a height h greater than the thickness t of the metal patch 2A and an outer diameter r1 a little shorter than the inner diameter r of the boss hole 21 of the metal patch 2A, is made. In the second step, the metal patch 2A is pressed against the inner surface 12 as it is guided by the circumference, or edge, of the boss 11a.

In the third step, the tip of the boss 11a is pressed by a hot plate 30 at a temperature higher than the thermosoftening temperature Tg of the boss 11a and lower than the melting temperature Tm of the boss 11a, so that a part of the boss 11a protruding from the upper surface of the metal patch 2A is softened and formed to provide the holder 11A that is shaped to cover a part of the upper surface of the metal patch 2A. Here, between the hot plate 30 and the metal patch 2A, a disk-like spacer 31 with a thermal resistance is inserted. The spacer 31 has a thickness t1 and a hole with a diameter r2 in the center. The spacer 31 serves to control the thickness of the holder 11A when pressing the hot plate 30 upon the boss 11a. The height h of the boss 11a and the thickness t1 of the spacer 31 are set to provide a strength so that the thickness and diameter of the resultant holder 11A can sufficiently hold the metal patch 2A. The diameter r2 of the spacer 31 is set to be greater than the range that the holder 11A extends in the direction of the circumference of the metal patch 2A. The hot plate 30 may be substituted by a soldering iron.

In the fourth step, the hot plate 30 and the spacer 31 are removed and the holder 11A is then cooled and hardened, so that the metal patch 2A is now held between the inner surface of the radome 12 and the holder 11A.

As explained above, in the first embodiment, the metal patch 2A can be fixed to the radome 1A by using the fabrication method as shown in FIGS. 3A to 3D. The radome 1A with the shape shown in FIG. 3A can be made by injection molding and the fixing step of the metal patch 2A to the radome 1A by the hot plate 30 is very simple. Thus, the patch antenna in the first embodiment can be made at a low cost.

Furthermore, the metal patch 2A can be precisely positioned as it is guided by the boss 11a of the radome 1A, which can be precisely formed. Therefore, it is not necessary for the patch antenna in the first embodiment to consider the deterioration in electrical performance caused by the position difference between the metal patch 2A and the radiating element 4.

Figure 4A:
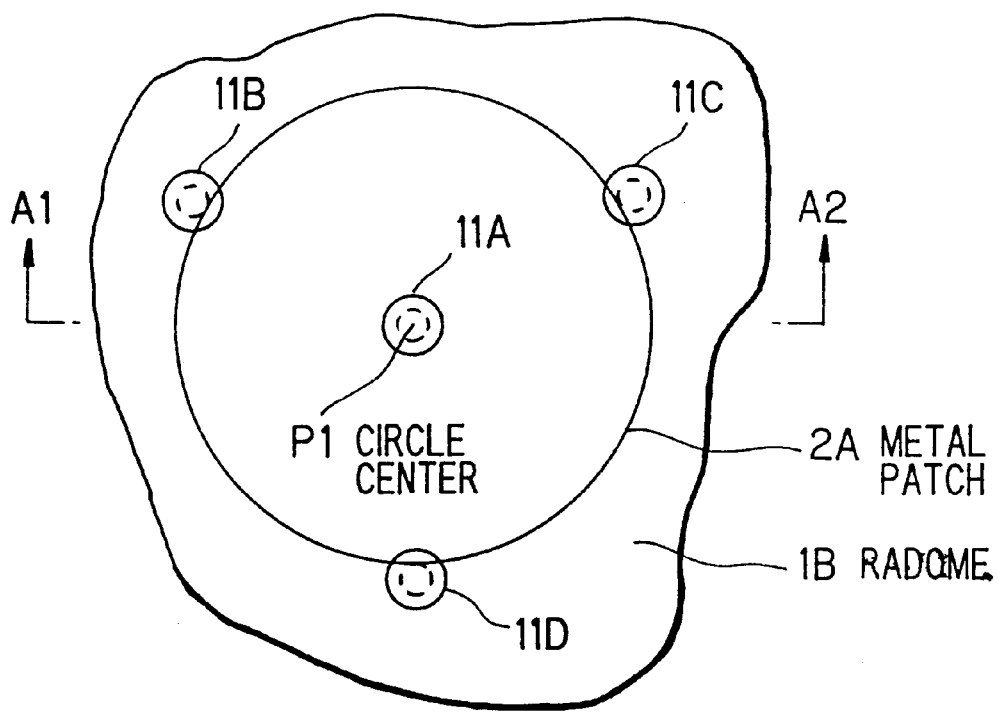
FIG. 4A is a partial plan view showing a patch antenna in a second preferred embodiment according to the invention.
Figure 4B:
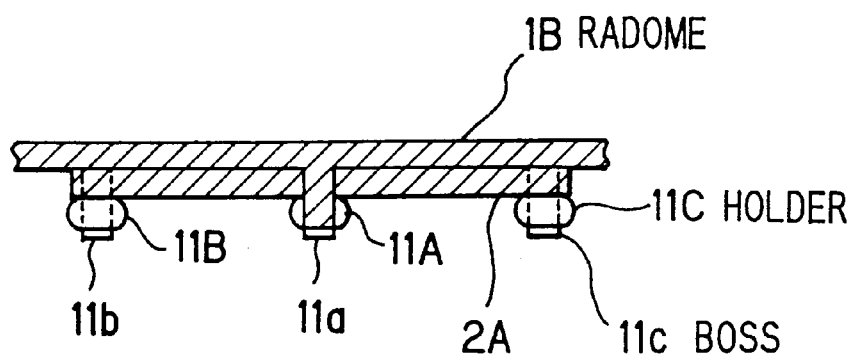
FIG. 4B is a cross sectional view cut along the line A1–A2 in FIG. 4A.

A patch antenna in the second preferred embodiment according to the invention will be explained by referring to FIGS. 4A and 4B, where FIG. 4A is a plan view thereof and FIG. 4B is a cross sectional view cut along the line A1–A2 in FIG. 4A.

In the second embodiment, the radome 1A in the first embodiment as shown in FIG. 1A is replaced by a radome 1B but the other parts are the same as for the first embodiment. The fabrication method in the first embodiment can be also used in the second embodiment. The radome 1B further comprises holders 11B, 11C and 11D in addition to the holder 11A of the radome 1A in FIG. 1A. Each of the holders 11B, 11C and 11D has a form that partially covers the lower surface near the edge of the metal patch 2A, when the metal patch 2A is fixed to the radome 1B. The holders 11B, 11C and 11D are, like the holder 11A, formed by thermosoftening and shaping the bosses 11b, 11c and 11d(not shown) which are preformed on the radome 1B, and thereafter cooling and hardening them. The bosses 11b, 11c and 11d are nearly in contact with the circumference of the metal patch 2A and are protruding from the inner surface 12 of the radome 1B at symmetrical points. By processing the bosses 11b, 11c and 11d as described above, the holders 11B, 11C and 11D, which are made by processing parts of the bosses 11b, 11c and 11d, respectively, are formed to cover the lower surface near the edge of the metal patch 2A. In the second embodiment, since the holders 11B, 11C and 11D, in addition to the holder 11A, hold the metal patch 2A onto the inner surface 12 of the radome 1B, the holding strength of the metal patch 2A onto the radome 1B is increased, therefore enhancing the electrical and mechanical stabilities.

Figure 5A:
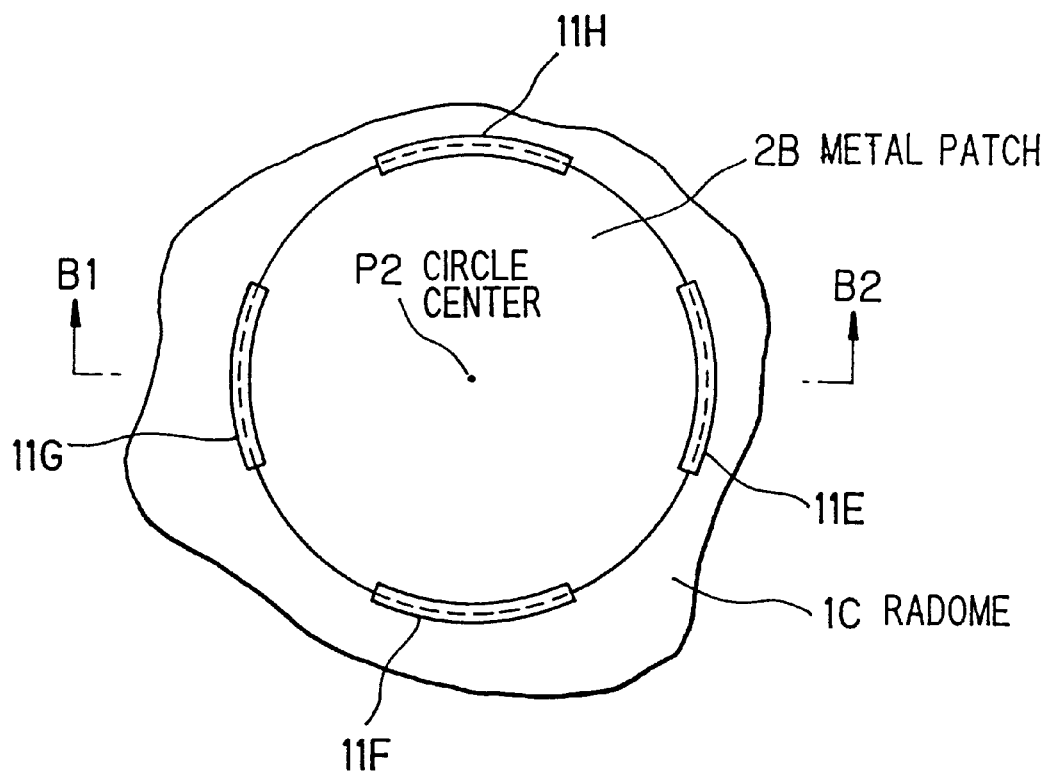
FIG. 5A is a partial plan view showing a patch antenna in a third preferred embodiment according to the invention.
Figure 5B:
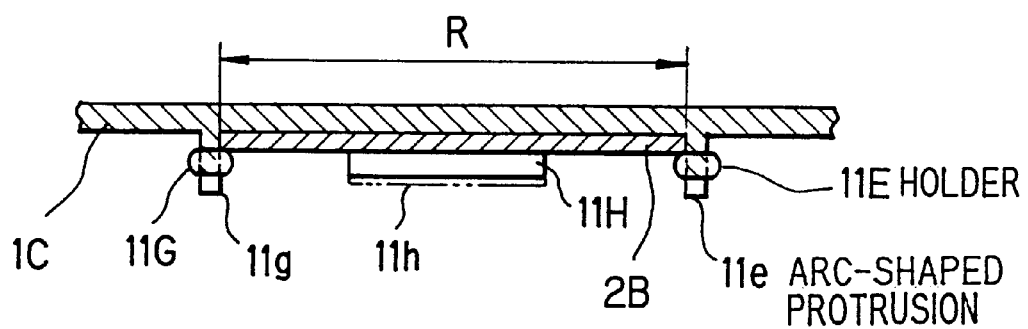
FIG. 5B is a cross sectional view cut along the line B1–B2 in FIG. 5A.

A patch antenna in the third preferred embodiment according to the invention will be explained by referring to FIGS. 5A and 5B, where FIG. 5A is a plan view thereof and FIG. 5B is a cross sectional view cut along the line B1–B2 in FIG. 5A.

In the third embodiment, the radome 1A and the metal patch 2A of the first embodiment are replaced by a radome 1C and a metal patch 2B, respectively, while the other parts are the same as for the first embodiment. The fabrication method in the first embodiment can be also used in the third embodiment. This patch antenna has a structure where the disk-like metal patch 2B is held onto the inner surface of the radome 1C at its circumference. Namely, there is formed no through-hole at the circle center P2 of the metal patch 2B. Also, the radome 1C does not include the holder 31A of the radome 1A as shown in FIG. 1A, and it is provided with holders 11E, 11F, 11G and 11H in place of the holder 11A. Each of the holders 11E, 11F, 11G and 11H has a form that partially covers the lower surface near the circumference of the metal patch 2B, when the metal patch 2B is fixed to the radome 1C.

The holders 11E, 11F, 11G and 11H are formed by thermosoftening and shaping arc-shaped protrusions 11e, 11f(not shown), 11g and 11h which are preformed on the radome 1C, and thereafter cooling and hardening them. The arc-shaped protrusions 11e, 11f, 11g and 11h which are symmetrically formed, protrude from the inner surface 12 of the radome 1C, and the inner walls of the arc-shaped protrusions are nearly in contact with the edge of the metal patch 2B. The holders 11E, 11F, 11G and 11H, which are made by processing parts of the arc-shaped protrusions 11e, 11f, 11g and 11h, respectively, are formed to cover the lower surface near the circumference of the metal patch 2B. In the third embodiment, since the holders 11E, 11F, 11G and 11F hold the metal patch 2B onto the inner surface 12 of the radome 1C, the holding strength of the metal patch 23 onto the radome 1C can be increased, therefore enhancing the electrical and mechanical stabilities.

Though, in the third embodiment, the holders 11E, 11F, 11G and 11H are formed as parts of a ring, they may be replaced by an integrated holder which is formed by substituting a ring-shaped protrusion for the arc-shaped protrusions 11e, 11f, 11g and 11h. Furthermore, the radome 1C may include a holder near the circle center P2 of the metal patch 2B.

Although the invention has been described with respect to specific embodiments for complete and clear disclosure, the claims are not to be thus limited but are to be construed as embodying all modification and alternative constructions that may occur to one skilled in the art which fairly fall within the basic teaching herein set forth.

What is claimed is:

1. A patch antenna, comprising:

a driven patch fed with a high-frequency signal to radiate a high-frequency electromagnetic field from its one surface;

a parasitic patch which receives said high-frequency electromagnetic field from said driven patch at a first surface and reradiates said high-frequency electromagnetic field from a second surface; and a radome protectably containing said driven patch and said parasitic patch inside of said radome and holding said parasitic patch;

wherein said parasitic patch is held by the inner surface of said radome, which contacts said second surface of said parasitic patch, and by a holder that protrudes from said inner surface of said radome and covers a part of said first surface of said parasitic patch.

2. A patch antenna as claimed in claim 1, wherein:

said parasitic patch has a through-hole at its center, and wherein said holder of said radome comprises a first holding member which penetrates said through-hole of said parasitic patch from said inner surface of said radome and covers a part of said first surface of said parasitic patch near said through-hole.

3. A patch antenna as claimed in claim 2, wherein:

said holder of said radome further comprises a plurality of second holding members which cover a part of said first surface near the edge of said parasitic patch.

4. A patch antenna as claimed in claim 1, wherein:

said holder of said radome covers a part or all of the circumference of said parasitic patch.

5. A patch antenna as claimed in claim 1, wherein:

said holder is formed using thermosoftenable material that is capable of being thermosoftened, shaped, cooled and then hardened after a positioning of said second surface of said parasitic patch onto said inner surface of said radome.

6. A patch antenna as claimed in claim 5, wherein:

said holder is disposed to act as a guide for said a positioning of said second surface of said parasitic patch.

7. A method for making a patch antenna, having a driven patch fed with a high-frequency signal that radiates a high-frequency electromagnetic field from its one surface, a parasitic patch that receives said high-frequency electromagnetic field from said driven patch at a first surface and reradiates said high-frequency electromagnetic field from a second surface, and a radome which protectively contains said driven patch and said parasitic patch inside of said radome and which holds said parasitic patch, comprising the steps of:

making said radome with an inner surface having a protruding boss with a height greater than a thickness of said parasitic patch;

pressing said second surface of said parasitic patch to contact said inner surface of said radome along the circumferential shape of said boss;

theremosoftening a part of said boss protruding above said first surface of said parasitic patch and forming it into a shape to cover a part of said first surface of said parasitic patch in order to provide a holder; and cooling and hardening said holder in order to hold said parasitic patch between said radome and said holder.

\* \* \* \* \*